(12) United States Patent
Christ et al.

(10) Patent No.: US 8,163,264 B2
(45) Date of Patent: Apr. 24, 2012

(54) EXPANDED GRAPHITE AND PROCESS FOR PRODUCING THE EXPANDED GRAPHITE

(75) Inventors: Martin Christ, Augsburg (DE); Reinhard Mach, Berlin (DE); Asmus Meyer-Plath, Potsdam (DE); Heinz-Eberhard Maneck, Wildau (DE)

(73) Assignee: SGL Carbon SE, Wiesbaden (DE)

( * ) Notice: Subject to any disclaimer, the term of this patent is extended or adjusted under 35 U.S.C. 154(b) by 679 days.

(21) Appl. No.: 12/268,005

(22) Filed: Nov. 10, 2008

(65) Prior Publication Data

US 2009/0130442 A1 May 21, 2009

(30) Foreign Application Priority Data

Nov. 8, 2007 (DE) .................... 10 2007 053 652

(51) Int. Cl.
*C01B 31/04* (2006.01)
*D01F 9/12* (2006.01)
*B32B 9/00* (2006.01)
*H05B 6/00* (2006.01)
*H05H 1/26* (2006.01)
*B01D 15/00* (2006.01)
*B32B 7/12* (2006.01)
*F16J 9/00* (2006.01)
*F28F 7/00* (2006.01)

(52) U.S. Cl. ........ 423/448; 423/447; 428/367; 264/482; 264/483; 210/660; 156/327; 277/300; 165/185

(58) Field of Classification Search .................... None
See application file for complete search history.

(56) References Cited

U.S. PATENT DOCUMENTS

| 3,404,061 A | 10/1968 | Shane et al. |
| 3,494,382 A | 2/1970 | Shane et al. |
| 6,919,527 B2 * | 7/2005 | Boulos et al. ............ 219/121.52 |
| 2010/0074835 A1 * | 3/2010 | Mercuri .................... 423/448 |

FOREIGN PATENT DOCUMENTS

| DE | 66804 | 6/1891 |
| DE | 1253130 | 10/1967 |
| DE | 102007023315 A1 | 10/2008 |
| EP | 0087489 | 9/1983 |
| EP | 87489 A * | 9/1983 |

OTHER PUBLICATIONS

Manning et al.; Synthesis of Exfoliated Graphite from Fluorinated Graphite Using an Atmospheric-Pressure ARgon Plasma; Carbon 37, pp. 1159-1164; 1999.*

* cited by examiner

*Primary Examiner* — Melvin Mayes
*Assistant Examiner* — Guinever Gregorio
(74) *Attorney, Agent, or Firm* — Laurence A. Greenberg; Werner H. Stemer; Ralph E. Locher

(57) ABSTRACT

An expanded graphite is derived from a graphitic or partially graphitic starting material selected from the group consisting of natural graphite, compressed expanded graphite, partially oxidized graphite and/or graphite fibers having a BET surface area of >30 m$^2$/g. The expanded graphite is obtained by reaction of the starting material with substances capable of intercalation or mixtures of substances capable of intercalation to give a compound designated as an intercalation compound and subsequent expansion in plasma.

16 Claims, No Drawings

EXPANDED GRAPHITE AND PROCESS FOR PRODUCING THE EXPANDED GRAPHITE

CROSS-REFERENCE TO RELATED APPLICATION

This application claims the priority, under 35 U.S.C. §119, of German application DE 10 2007 053 652.8, filed Nov. 8, 2007; the prior application is herewith incorporated by reference in its entirety.

BACKGROUND OF THE INVENTION

Field of the Invention

The invention relates to an expanded graphite produced from a graphitic or partially graphitic starting material selected from the group consisting of natural graphite, compressed expanded graphite, partially oxidized graphite and graphite fibers, with the starting material being reacted with substances capable of intercalation or mixtures of substances capable of intercalation to give a compound referred to hereinafter as intercalation compound and subsequently being expanded. The invention further relates to the use of these materials.

German patent DE 66804 C discloses the production of expanded graphite particles having a worm-like structure by thermal decomposition of a graphite intercalation compound as is obtained, for example, by action of concentrated sulfuric acid or a mixture of nitric acid and sulfuric acid on natural graphite particles. The expanded particles, hereinafter referred to as expanded graphite, are extraordinarily malleable and have high specific surface areas. The shapeability of the expanded graphite particles, the strength and flexibility of the articles produced from the particles and the specific surface area of the particles are determined essentially by the degree of expansion, which for the present purposes is the expansion of the particles in the direction of the c axis of the graphite crystal, which can be quantified by an increase in volume of a particle bed. According to German patent DE 1253130 C1, corresponding to U.S. Pat. Nos. 3,494,382 and 3,404,061, the degree of expansion should be at least 80, preferably at least 200, since shaped bodies produced by pressing together of expanded particles without the addition of a binder then acquire sufficient strength.

The expansion of the graphite particles is obviously attributable to the fact that during heating expanding gaseous decomposition and/or vaporization products of the intercalation compounds push the layers or packets of layers of the graphite crystal apart. This process ends with the breakout of the gas which is initially enclosed within the individual grains and the degree of expansion is approximately inversely proportional to the amount of gas escaping during the heating phase (M. B. Dowell, 12. Conf. on Carbon. Jul. 28 to Aug. 1, 1975, Pittsburgh, Pa., p. 31). To produce graphite particles which have a high degree of expansion and a good processability and a high specific surface area, it is necessary for significantly more gas to be produced in the interior of the solid than can flow out through resulting channels, cracks and pores for a certain period of time.

SUMMARY OF THE INVENTION

It is accordingly an object of the invention to provide an expanded graphite and process for producing the expanded graphite that overcome the above-mentioned disadvantages of the prior art methods and devices of this general type. With the foregoing and other objects in view there is provided, in accordance with the invention, a method for producing an expanded graphite. The method includes selecting a starting material from natural graphite, compressed expanded graphite, partially oxidized graphite, and/or graphite fibers having a BET surface area of >30 $m^2/g$; reacting the starting material with substances capable of intercalation or mixtures of substances capable of intercalation resulting in a compound designated as an intercalation compound; and performing a subsequent expansion in plasma.

The object is achieved by treating the starting material of the type mentioned at the outset with a plasma.

It has surprisingly been found that plasma can, under the chosen conditions, achieve such a high heating rate of the material that expansion occurs despite a very short residence time of the intercalation compound in the hot plasma zone, which can be in the millisecond range. Expanded graphites having a BET surface area of >30 $m^2/g$ are obtained.

Furthermore, it has been found that an expanded graphite obtained in this way has a surface area which is greater than that of the expanded graphite known from the prior art and can be chemically and morphologically modified. This enables a disadvantage of the known expanded graphites, namely a low wettability of the material for many media, to be overcome. The novel expanded graphites can, for example, be used as an absorbent material for liquid or gaseous media or as aggregate for composite materials.

Compared to the processes known from the prior art for producing expanded graphites, the process of the invention allows a significantly higher process versatility in respect of the production of chemically and morphologically modified expanded graphites. The expansion and the modification can be brought about in only one step. The process therefore has process engineering advantages over the sequential process described in published, non-prosecuted German patent application DE 10 2007 023 315 A1 titled "Process for Producing a Latent Heat Storage Material". For example, the specific surface area and the surface morphology of the expanded material can be modified by introduction of oxygen or other gases having a dry etching action as a process gas. Furthermore, functional chemical surface groups can be produced on the surfaces of the expanded material which are in contact with the gas phase by introduction of functionalizing process gases.

The object of simultaneous expansion and modification is achieved by exposing the material to be expanded to the action of plasma to which one or more process gases can be added. For this purpose, the material to be expanded can be moved as a bed on a transport device through the plasma, sprinkled as individual particles through the plasma, sprayed or held in a fluidized bed in the plasma zone. The plasma is preferably produced as a localized zone, for example as a plasma flame, laser focus or as extended excited region, for example a microwave discharge.

In this procedure, the plasma serves as a source of high-energy gaseous species, for example rotationally, vibrationally and/or electronically excited molecules or free radicals, electronically excited atoms or ions of the surrounding gas atmosphere and also electrons and photons. These species transfer sufficient enthalpy from the plasma gas phase to the intercalation compound for the heating rate and residence time of the material introduced to be sufficient to expand the intercalation compound. In addition, the chemically active constituents of the gas atmosphere can act on the chemical bonds of the surface of the intercalation compound or of the expanded graphite which is in contact with the gas phase in such a way that bond ruptures in the surface and subsequently formation of reaction products with species of the gas phase occur. These reactions make themselves apparent in the form of functional surface groups or lead to ablation of material. The type of chemical or morphological modification of the particle surface taking place simultaneously with expansion as a result of the plasma can be influenced by choice of the plasma process gases added and/or by the type of intercalation compound. As a result, the plasma can have an etching, chemically modifying or coating action. Many different functional groups or closed or open layers can in this way be produced on expanded surfaces. These include oxygen-containing, nitrogen-containing, halogen-containing, silicon-containing, phosphorus-containing, metal-containing and other groups or layers composed of these.

Expanded graphites which have been surface-functionalized in this way have improved wettability for selected liquid or gaseous media. They can be used, for example, as adsorbent materials. Functional groups or layers can also help improve the dispersibility of expanded graphites, which is helpful for the production of composite materials containing homogeneously distributed graphite particles. A specific functionalization or coating can additionally lead to a chemical interaction between expanded graphite and the surrounding matrix of a composite material, by which, for example, the mechanical or thermal conduction or electrical properties of the composite can be influenced in a positive way.

The energy necessary for production and operation of the plasma can be introduced into the process gas by use of ions, electrons, electric or electromagnetic fields including radiation. Industrially, excitation of a gas plasma suitable for expansion of intercalation compounds can be achieved in a very high pressure range, preferably in the high pressure range from 50,000 to 150,000 Pa, particularly preferably in the region of atmospheric pressure, by use of a DC gas discharge or high-frequency or low-frequency AC gas discharge, a high-energy electromagnetic radiation field, as is produced, for example, by a microwave source or a laser, or by a source of electrons or ions.

When a laser is used in the process described here, this must, in contrast to the expansion by laser radiation described in European patent application EP 87489 A1, exceed a critical radiation density above which a plasma which additionally heats the intercalation compound by the radiation in the form of photons and also via the enthalpy input of rotationally, vibrationally and/or electronically excited gas molecules, atoms, ions or free radicals is formed in the laser focus.

In the process of the invention, the plasma is operated discontinuously or, preferably, continuously. The temperature of the uncharged gas component of the plasma should preferably be above 500 K.

The plasma can be generated in process gases under reduced atmospheric pressure and also under superatmospheric pressure, and for the process to be carried out simply, it is preferably generated in process gases under or close to atmospheric pressure.

The expansion according to the invention of the intercalation compounds in the plasma allows very high expansion rates at very short process times which can be in the millisecond range. The degree of expansion can be controlled within a wide range via the plasma power and the residence time of the particles in the hot plasma zone.

The size of the particles of an intercalation compound which can be expanded by plasma extends from a number of millimeters down into the two-decimal-place nanometer range. Apart from intercalated graphitic or partially graphitic compounds, it is also possible for intercalated graphitic carbon fibers and intercalated graphitic carbon nanofibers to be expanded by means of the process.

Other features which are considered as characteristic for the invention are set forth in the appended claims.

Although the invention is described herein as embodied in an expanded graphite and process for producing the expanded graphite, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

The invention is illustrated below with the aid of examples.

COMPARATIVE EXAMPLE 1

Commercially available graphite hydrogen sulfate SS3 (from Sumikin Chemical Co., Ltd., Tokyo, Japan) was heated in a shock-like fashion to 1,000° C. in a muffle furnace. The expanded material obtained in this way had a density of 5 kg $m^3$. Its chemical composition was, according to XPS analysis, C=97.1 atom % (at. %); O=1.9 at. %. The expanded graphite obtained has a BET surface area of 19 $m^2/g$. The water absorption of a shaped body having a density of 500 $kg/m^3$ composed of the pressed expanded material was, after storage in distilled water for five minutes, less than 10% of the mass of the shaped body.

EXAMPLE 1

Commercially available graphite hydrogen sulfate SS3 was blown at atmospheric pressure into an inductively coupled thermal plasma flame excited at 4 MHz. 70 standard liters per minute (slm) of argon were added as the process gas. The electric power introduced was 1.45 kW. The feed rate of the graphite hydrogen sulfate was 7.3 g/60 s and its inflow velocity was 5.9 m/s. The expanded material obtained had a density of 4.7 $kg/m^3$. Its chemical composition was, according to XPS analysis, C=95 at. % and O=5 at. %. The energy efficiency was 3.3 kWh/kg of expanded material. The expanded graphite obtained has a BET surface area of 38 $m^2/g$. The water absorption of a shaped body having a density of 500 $kg/m^3$ composed of the pressed expanded material was, after storage in distilled water for five minutes, less than 303% of the mass of the shaped body.

EXAMPLE 2

Commercially available graphite hydrogen sulfate SS3 was blown at atmospheric pressure into an inductively coupled thermal plasma flame excited at 4 MHz. 120 slm of argon were added as a process gas. The electric power introduced was 9.6 kW. The feed rate of the graphite hydrogen sulfate was 3.1 g/60 s and its inflow velocity was 1.5 m/s. The expanded material obtained had a density of 1.9 $kg/m^3$. Its chemical composition was, according to XPS analysis, C =97.7 at. % and O=2.3 at. %. The energy efficiency was 51.9 kWh/kg of expanded material. The expanded graphite obtained has a BET surface area of 45 $m^2/g$. The water absorption of a shaped body having a density of 500 $kg/m^3$ composed of the pressed expanded material was, after storage in distilled water for five minutes, less than 41% of the mass of the shaped body.

EXAMPLE 3

Commercially available graphite hydrogen sulfate SS3 was blown at atmospheric pressure into an inductively coupled thermal plasma flame excited at 4 MHz. 120 slm of argon were added as process gas. The electric power introduced was 5.4 kW. The feed rate of the graphite hydrogen sulfate was 3.0 g/60 s and its inflow velocity was 5.9 m/s. The expanded material obtained had a density of 4.1 kg/m$^3$. Its chemical composition was, according to XPS analysis, C=96.9 at. % and O=3.1 at. %. The energy efficiency was 27.2 kWh/kg of expanded material. The expanded graphite obtained has a BET surface area of 42 m$^2$/g. The water absorption of a pellet composed of the pressed expanded material was, after storage in distilled water for five minutes, less than 270% of the mass of the pellet.

EXAMPLE 4

Commercially available graphite hydrogen sulfate SS3 was blown at atmospheric pressure into an inductively coupled thermal plasma flame excited at 4 MHz. 120 slm of argon were added as the process gas. The electric power introduced was 5.8 kW. The feed rate of the graphite hydrogen sulfate was 3.0 g/min and its inflow velocity was 53.1 m/s. The expanded material obtained had a density of 15.2 kg/m$^3$. Its chemical composition was, according to XPS analysis, C=96.1 at. % and O=3.9 at. %. The energy efficiency was 32.2 kWh/kg of expanded material. The expanded graphite obtained has a BET surface area of 30 m$^2$/g. The water absorption of a shaped body having a density of 500 kg/m$^3$ composed of the pressed expanded material was, after storage in distilled water for five minutes, less than 439% of the mass of the shaped body.

The invention claimed is:

1. A method for producing a surface functionalized expanded graphite from a graphite intercalation compound, which comprises the steps of:
    selecting a starting material from the group consisting of natural graphite, compressed expanded graphite, partially oxidized graphite, and graphite fibers;
    reacting the starting material with one of substances capable of intercalation and mixtures of substances capable of intercalation resulting in a compound designated as an intercalation compound;
    providing a plasma flame;
    adding process gases to the plasma flame, the process gases being selected from the group consisting of gases that generates nitrogen-containing functional groups on surfaces of expanded graphite, gases that generates halogen-containing functional groups on surfaces of expanded graphite, gases that generate silicon-containing functional groups on surfaces of expanded graphite, gases that generate phosphorus-containing functional groups on surfaces of expanded graphite and gases that generate sulfur-containing functional groups on surfaces of expanded graphite;
    blowing the intercalation compound into the plasma flame; and
    performing simultaneous chemical and morphological modification of said intercalation compound by a subsequent expansion of said intercalation compound in the plasma to obtain surface functionalized expanded graphite having a BET surface area of >30 m$^2$/g.

2. The method according to claim 1, which further comprises performing a heating step which leads to expansion of the intercalation compound as a result of enthalpy input of the process gas excited by means of the plasma.

3. The method according to claim 1, which further comprises treating the intercalation compound in the plasma of an electrostatic field.

4. The method according to claim 1, which further comprises treating the intercalation compound in the plasma of at least one electromagnetic AC field.

5. The method according to claim 4, which further comprises treating the intercalation compound in the plasma having an electromagnetic excitation frequency is below 100 Hz.

6. The method according to claim 5, which further comprises setting the electromagnetic excitation frequency at a grid frequency of 50 or 60 Hz.

7. The method according to claim 4, which further comprises treating the intercalation compound in the plasma having an electromagnetic excitation frequency is in a low-frequency range from 100 Hz to 10 kHz.

8. The method according to claim 4, which further comprises treating the intercalation compound in the plasma having an electromagnetic excitation frequency is in a radiofrequency range from 10 kHz to 300 MHz.

9. The method according to claim 8, which further comprises setting the electromagnetic excitation frequency at a multiple of the industrially supplied 13.56 MHz.

10. The method according to claim 4, which further comprises treating the intercalation compound in the plasma having an electromagnetic excitation frequency is in a microwave range from 300 MHz to 300 GHz.

11. The method according to claim 10, which further comprises setting the electromagnetic excitation frequency at a multiple of the industrially supplied 2.45 GHz.

12. The method according to claim 4, which further comprises treating the intercalation compound in the plasma having an electromagnetic excitation frequency is in a range above 300 GHz.

13. The method according to claim 12, which further comprises treating the intercalation compound with laser radiation.

14. The method according to claim 1, which further comprises treating the intercalation compound in the plasma having activating process gases selected from the group consisting of the noble gases.

15. The method according to claim 1, which further comprises treating the intercalation compound in the plasma to which oxidizing process gases such as air, oxygen, carbon dioxide, water or solutions containing hydrogen peroxide are added.

16. The method according to claim 1, which further comprises treating the intercalation compound in the plasma to which reducing process gases such as hydrogen are added.

* * * * *